United States Patent [19]
Bodson

[11] 3,867,516
[45] Feb. 18, 1975

[54] METHOD OF PREPARING A PIGMENT ON AN IRON OXIDE BASE

[75] Inventor: Fernand Jacques Joseph Bodson, Angleur, Belgium

[73] Assignee: Societe des Mines et Fonderies de Zinc de La Vieille Montagne, Societe Anonyme, B-4900 Angleur, Belgium

[22] Filed: Apr. 10, 1972

[21] Appl. No.: 242,773

[30] Foreign Application Priority Data
May 3, 1971 Belgium .................................. 43279

[52] U.S. Cl. ................. 423/632, 423/144, 423/633, 75/120, 106/304
[51] Int. Cl. ......................................... C01g 9/02
[58] Field of Search ........... 423/632, 140, 144, 150, 423/633; 106/304; 75/120; 204/119

[56] References Cited
UNITED STATES PATENTS

| | | | |
|---|---|---|---|
| 691,324 | 1/1902 | Ramage .............................. | 423/632 |
| 1,964,683 | 6/1934 | Ayers .................................. | 106/304 |
| 2,255,607 | 9/1941 | Ayers .................................. | 106/304 |
| 2,620,261 | 12/1952 | Toxby ................................. | 423/633 |
| 2,696,426 | 12/1954 | Marcot ............................... | 423/633 |
| 2,754,174 | 7/1962 | Roberts ............................... | 423/140 |
| 2,904,402 | 9/1959 | Canterman ......................... | 106/304 |
| 3,434,947 | 3/1969 | Steintveit ............................ | 423/140 |
| 3,549,321 | 12/1970 | Everett ................................ | 423/140 |
| 3,687,828 | 8/1972 | Carpenter et al. ................. | 75/120 X |

FOREIGN PATENTS OR APPLICATIONS
724,214   5/1969   Belgium

*Primary Examiner*—O. R. Vertiz
*Assistant Examiner*—Brian E. Hearn
*Attorney, Agent, or Firm*—Kaufman & Kramer

[57] ABSTRACT

In a method of preparing a pigment on an iron-oxide base from a sulphate solution containing in particular ferrous sulphate and derived from the leaching of zinc residues, said solution is neutralized and oxidized to simultaneously precipitate the hydrolyzable impurities together with a small quantity of iron, then the supernatant remaining liquid is separated from the precipitate and is neutralized and oxidized to precipitate most of the iron as an oxide, and the latter precipitate is treated in a basic medium to remove the small amount of sulphate ion present therein.

11 Claims, No Drawings

METHOD OF PREPARING A PIGMENT ON AN IRON OXIDE BASE

This invention relates to a method of preparing a pigment of an iron oxide base in particular from a sulphate solution, containing in particular ferrous sulphate and derived from the treatment of residues from zinc leaching.

In order to recover certain elements, in particular zinc, it is known to treat the residues from zinc metallurgy according to different procedures. In particular a procedure is known in which the residues are subjected to subsequent leaching using sulphuric acid to produce inter alia a solution of zinc sulphate and ferric sulphate; the latter is reduced by the addition of zinc sulphide to form ferrous sulphate and the iron is eliminated as oxides in a residue which at the moment constitutes waste material which has no particular value or commercial use.

The present invention is concerned with finding a use for this residue by converting it in an economic and simple manner into an iron-based pigment which constitutes a product of considerable industrial and commercial value and which can be used in a number of applications.

The invention consists in a method of preparing a pigment on an iron-oxide base from a sulphate solution containing in particular ferrous sulphate and derived from the leaching of zinc residues, comprising: neutralizing and oxidising the said sulphate solution to simultaneously precipitate the hydrolyzable impurities present in the sulphate solution together with a small quantity of iron; separating the supernatant remaining liquid from the precipitate; neutralizing and oxidising the said separated liquid to precipitate most of the iron as an oxide, and treating the latter precipitate in a basic medium to remove the small amount of sulphate ion present therein.

Thus an iron pigment is produced from a solution containing ferrous sulphate, and derived from the treatment of zinc residues by means of a process wherein the precipitation of the iron takes place in two main steps.

In the first step the hydrolyzable impurities and a small quantity of iron present are simultaneously precipitated by neutralization and oxidation of the ferrous sulphate solution, and the precipitate thus formed is separated from the filtrate. It has been confirmed that the elimination of the hydrolyzable impurities such as arsenic, antimony, germanium, aluminium and silicon, is practically complete and can be easily carried out by decanting and filtration of the precipitate obtained without loss of a significant quantity of iron contained in the separated precipitate. In the second step the iron contained in the filtrate is precipitated substantially in the form of oxides by neutralization and oxidation. The product which is obtained of sufficient purity to serve as a base product for obtaining high quality pigments.

Preferably the first step of the processing is carried out under the following conditions. The solution containing the impurities and the iron in the ferrous state is heated to a temperature of 90°C and the pH of the solution is raised to a value greater than 2 more preferably 4, by adding substances containing zinc oxide such as calcined blende. Air is blown into the solution to precipitate the impurities simultaneously with approximately 10 percent of the iron contained in the solution.

In the second step of the process substantially all the iron remaining in the filtrate is precipitated by first treating the filtrate with substances containing zinc oxide such as calcined blende, and oxidising the filtrate by atmospheric oxygen at a temperature of about 90°C and at a pH between 1.7 and 2.5 more preferably 2, to produce an iron precipitate. The filtrate may be oxidised by blowing in finely dispersed air, preferably at the rate of 10 $Nm^3$ per hour and per $m^3$ of solution. The precipitate produced by this method is bright yellow and is shown by X-ray diffraction to be goethite, FeOOH.

It has however been confirmed by chemical analysis that the latter product contains a little sulphur in the form of sulphate ions, probably held in the crystalline lattice of the goethite. The presence of these sulphate ions is undesirable either if the product is to be used as a goethite-based pigment as produced or in the preparation of other iron pigments on the basis of goethite.

These sulphate ions may be removed by treating the goethite precipitate obtained in a basic liquid medium at relatively high temperature of about 90°C; the solubilization of the sulphate ions occurs while the colour of the precipitate becomes clearer. Preferably the goethite precipitate is washed in water having a slightly basic pH value; bicarbonate of soda may be added to the water to make the latter slightly basic. This step is carried out for a precipitate having a sulphate sulphur content lower than 2 percent.

If the precipitate has a sulphate sulphur content greater than 2 percent it is observed when treating this precipitate in basic medium that if the sulphate sulphur content of the precipitate decreases then the colour of the pigment darkens and becomes more orange. Molecular analysis by means of X-ray diffraction reveals the presence of hematite $Fe_2O_3\alpha$, in the washed product.

It is known that three iron oxides have wide application as pigments: these are the yellow pigment of goethite ($FeOOH\alpha$), the red pigment or hematite ($Fe_2O_3\alpha$) and magnetite ($Fe_3O_4$). One or other of these three pigments may be obtained as described below.

If the goethite precipitate which is obtained after washing in basic medium at a temperature of 90°C is then washed in water and dried, preferably at a temperature not greater than 150°C; the precipitate then exhibits the colour, granulometry, oil retentivity, colouring power and dispersion characteristics of a high-quality yellow iron pigment.

If, however, the goethite precipitate which is obtained after washing in basic medium at a temperature of 90°C is then washed in water and calcined at a temperature between 700° and 750°C, preferably at 725°C, for at least 4 hours, then the precipitate is converted into a red hematite pigment having the desired pigmentary characteristics.

According to a further alternative if the goethite precipitate is reduced by hydrogen under pressure in a 5N sodium solution for 4 hours at a temperature between 175° and 250°C, preferably at 215°C, and washed in water and dried at a temperature not greater than 150°C, then the precipitate is converted into a high-quality black pigment.

The invention will be further described with reference to the following example.

In the course of leaching zinc residues there was obtained a solution containing 30 gr. of ferrous iron and 120 grams of zinc in the form of sulphates per litre.

This solution was heated to 90°C and maintained at a pH value of 4 by means of calcinated blende. Finely dispersed air was bubbled through the solution for 30 minutes after which the residue of the purified solution was separated.

Various impurities were mixed into the solution before and after this purification, and their concentrations measured. The results obtained are given below.

|  | before purification | after purification |
|---|---|---|
| Fe | 30 g/l | 27.2 g/l |
| As | 390 mg/l | <10 mg/l |
| Sb | 37 mg/l | < 1 mg/l |
| Ge | 7 mg/l | < 1 mg/l |
| $Al_2O_3$ | 400 mg/l | <10 mg/l |
| $SiO_2$ | 150 mg/l | <50 mg/l |

The purified solution was maintained at 90°C and there was added thereto a substance containing zinc oxide titrating 69 percent of zinc in such a way that the pH was maintained at a value of 2. Finely dispersed air was then blow in at the rate of 10 N m$^3$ per hour and per m$^3$ of volume of solution for 12 hours.

The goethite precipitate obtained was bright yellow and after separation and washing in water was found to contain the various elements in the following stated amouts:

Fe: 55.85%; Zn: 1.55%; Cu: 0.039%; S(as sulphate): 1.75%.

This precipitate was then washed for 6 hours at 90°C in water maintained at a pH value of 7.5 by the addition of bicarbonate of soda. The precipitate was then washed in air and dried at 150°C to give a yellow iron pigment.

Analysis of the product indicated that the various elements were present in the following stated amounts:

Fe: 59.15%; Zn: 1.93%; Cu: 0.047%; S (as sulphate): 0.22%.

As an alternative the geothite precipitate was calcined at 725°C to convert it into a bright red hematite pigment in which the various elements were present in the following stated amounts:

Fe: 67.40%; Zn: 2.26%; Cu: 0.047%; S (as sulphate): 0.044%.

As a further alternative the goethite precipitate was reduced by hydrogen under pressure at 215°C for 4 hours in a 5 N caustic soda medium, to convert it into a black iron pigment, $Fe_3O_4$, in which the various elements were present in the following stated amounts:

Fe: 70%; Zn: 0.7%; Cu: 0.04; S (as sulphate): 0.020%.

What we claim is:

1. A method of preparing an iron oxide pigment base from a sulfate solution derived from the leaching of zinc residues and containing, in particular, ferrous sulfate comprising: heating said sulfate solution to a temperature of about 90°C., adding to said solution a zinc oxide-containing material to raise the pH to a value above 2, blowing air into said solution to precipitate the hydrolyzable impurities together with about 10% of the iron, separating the filtrate, maintaining said filtrate at a temperature of about 90°C. and adding sufficient zinc oxide-containing material to obtain a pH value between 1.7 and 2.5, blowing dispersed air into said filtrate to precipitate iron in the form of goethite and treating said latter precipitate with a basic liquid medium to remove sulfate ions present in said precipitate.

2. A method as claimed in claim 1 wherein said zinc oxide-containing material is calcined blende.

3. A method as claimed in claiam 1 wherein the ferrous sulfate solution is maintained at a pH value of 4.

4. A method as claimed in claim 1 wherein the filtrate is maintained at a pH value of 2.

5. A method as claimed in claim 1 wherein finely dispersed air is blown into said filtrate at the rate of 10NM$^3$ per hour and per M$^3$ of solution.

6. A method as claimed in claim 1 wherein said geothite precipitate is washed at 90°C. in water having a basic pH value to remove said sulfate ions.

7. A method as claimed in claim 6 wherein bicarbonate of soda is added to the water to make the latter basic.

8. A method as claimed in claim 1 wherein after removal of the sulfate ions, the goethite precipitate is washed in water and dried at a temperature not greater than 150°C. to give a yellow iron pigment.

9. A method as claimed in claim 1 wherein after removal of the sulfate ions, said goethite precipitate is washed in water and then calcined at a temperature between 700° and 750°C. to give a red iron pigment.

10. A method as claimed in claim 9 wherein said washed goethite precipitate is calcined for at least 4 hours.

11. A method as claimed in claim 1 wherein said goethite precipitate is reduced by hydrogen under pressure in a 5 N sodium solution at a temperature between 175° and 250°C. and then washed in water and dried at a temperature not greater than 150°C. to give a black iron pigment.

* * * * *